(12) United States Patent
Sue

(10) Patent No.: US 7,756,867 B2
(45) Date of Patent: Jul. 13, 2010

(54) RANKING DOCUMENTS

(75) Inventor: Ryan Sue, Fremont, CA (US)

(73) Assignee: Yahoo! Inc., Sunnyvale, CA (US)

(*) Notice: Subject to any disclaimer, the term of this patent is extended or adjusted under 35 U.S.C. 154(b) by 340 days.

(21) Appl. No.: 11/707,733

(22) Filed: Feb. 16, 2007

(65) Prior Publication Data

US 2008/0201317 A1    Aug. 21, 2008

(51) Int. Cl.
*G06F 7/00* (2006.01)

(52) U.S. Cl. .................... 707/723; 707/727

(58) Field of Classification Search .......... 707/3, 707/4
See application file for complete search history.

(56) References Cited

U.S. PATENT DOCUMENTS

| | | | |
|---|---|---|---|
| 7,308,643 B1 * | 12/2007 | Zhu et al. | 715/206 |
| 7,440,968 B1 * | 10/2008 | Oztekin et al. | 707/102 |
| 2002/0069194 A1 * | 6/2002 | Robbins | 707/3 |
| 2003/0041054 A1 | 2/2003 | Mao et al. | |
| 2004/0030690 A1 | 2/2004 | Teng et al. | |
| 2005/0192946 A1 | 9/2005 | Lu et al. | |
| 2006/0041562 A1 | 2/2006 | Paczkowski et al. | |
| 2006/0288001 A1 * | 12/2006 | Costa et al. | 707/5 |
| 2007/0038601 A1 | 2/2007 | Guha | |
| 2007/0038614 A1 * | 2/2007 | Guha | 707/4 |
| 2007/0192300 A1 | 8/2007 | Reuther et al. | |

OTHER PUBLICATIONS

Notification of Transmittal of the International Search Report and the Written Opinion of the International Searching Authority, or the Declaration received in International application No. PCT/IB2008/00278 dated Aug. 26, 2009 (11 pages).
Current claims of International application No. PCT/IB2008/00278, Oct. 2009 (3 pages).
U.S. Appl. No. 11/707,684, filed Feb. 16, 2007, Office Action, Mailed Jan. 5, 2009.

* cited by examiner

*Primary Examiner*—Apu M Mofiz
*Assistant Examiner*—Cindy Nguyen
(74) *Attorney, Agent, or Firm*—Hickman Palermo Truong & Becker LLP; Marcel K. Bingham; Sarah M. Savage

(57) ABSTRACT

A plurality of documents are ranked. The documents are returned as the result of a query computed for each search engine of a plurality of search engines. Each document of the plurality of documents is associated with a Uniform Resource Locator (URL). The plurality of documents includes at least one document returned as a result of the query from each of the search engines. For each URL associated with a document from the plurality of documents, a frequency of the URLs is determined. Ranking the plurality of documents includes ranking them based on one or more factors, which are based on the frequency determined for each URL associated with the plurality of documents.

18 Claims, 3 Drawing Sheets

Example Process 100

Rank a Plurality of Documents, each Document Associated with a URL, which are Returned as the Result of a Query Computed for each Search Engine of a Plurality of Search Engines, in which ≥ 1 Document is Returned as a Result of the Query from each Search Engine 101

For each URL Associated with a Document of the Plurality of Documents, Determine a Frequency of the URL, in which the Ranking (101) includes Ranking the Plurality of Documents based on ≥ 1 Factors, which are based on the Frequency Determined for each URL Associated with the Plurality of Documents 102

Example Process 100

Rank a Plurality of Documents, each Document Associated with a URL, which are Returned as the Result of a Query Computed for each Search Engine of a Plurality of Search Engines, in which $\geq$ 1 Document is Returned as a Result of the Query from each Search Engine 101

For each URL Associated with a Document of the Plurality of Documents, Determine a Frequency of the URL, in which the Ranking (101) includes Ranking the Plurality of Documents based on $\geq$ 1 Factors, which are based on the Frequency Determined for each URL Associated with the Plurality of Documents 102

FIG. 1

RANKING DOCUMENTS

TECHNOLOGY

The present invention relates generally to information retrieval, and more specifically, to ranking documents.

BACKGROUND

Standard web and internet searches typically cover a small portion, perhaps only about ten percent, of the information that is accessible via the web. There are various reasons for this limitation. One such reason relates to scalability. For instance, significant costs, effort and infrastructure are associated with storing and indexing data, keeping information fresh and accessibly available. For information that is accessed relatively rarely, the costs may seem excessive in relation to the apparent demand, usefulness, etc. of the information. Doing this for all information that may be accessible via the web could be cost prohibitive.

Second, standard web search engines are deterred from accessing much of the information on the web because standard web crawlers, which help to build the indexes used by the search engines for searching, may lack the ability to get at that information. For example, a web crawler may not be able to access a database or a website that requires positive access enablement, such as password authentication or other security measures.

Finally, standard web search is designed for breadth and popularity, spanning the upper stratum of more popular information. While designed, in a sense, to return search results that may most probably please the most users, most of the time, many standard web search results may lack relevance for significant numbers of users. Seeking more relevant search results, vertical searching may be used, which is more specific than standard web search, being oriented more for specific domains and topics. However, users of vertical searching issue queries to and retrieve information from each search engine separately. With a relatively small selection of search engines, this practice may be more or less manageable. However, with many vertical search engines, it may soon become inefficient and expensive.

Based on the foregoing, it would be useful to perform vertical searches more effectively.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 depicts an example process, according to an embodiment of the present invention;

DESCRIPTION OF EXAMPLE EMBODIMENTS

Figure 2:
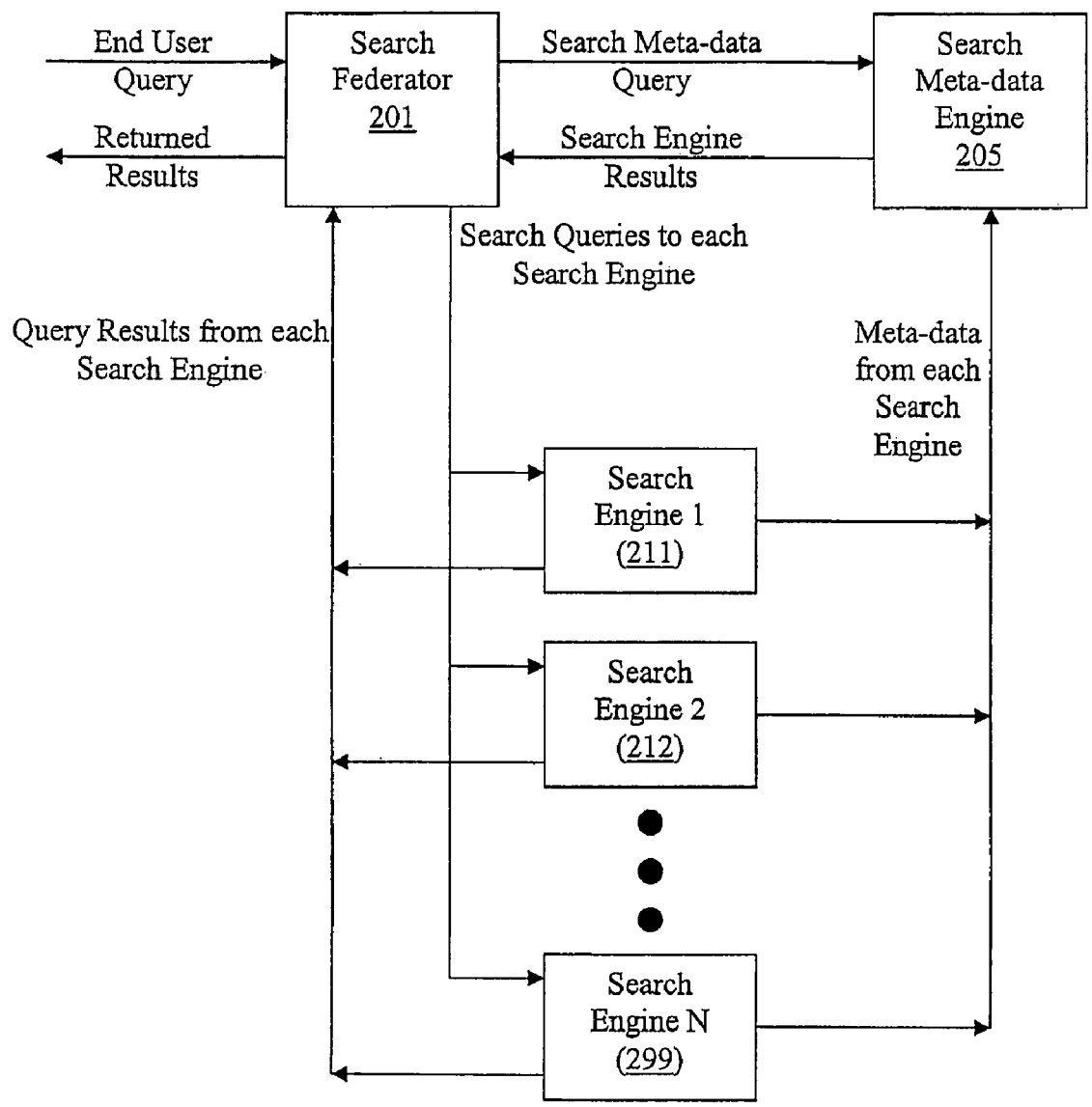
FIG. 2 depicts an example system, according to an embodiment of the present invention.

Example embodiments ranking documents are described herein. In the following description, for the purposes of explanation, numerous specific details are set forth in order to provide a thorough understanding of the present invention. It will be apparent, however, that the present invention may be practiced without these specific details. In other instances, well-known structures and devices are referred to without exhaustive treatment, in order to avoid unnecessarily obscuring the present invention.

Overview

According to an embodiment, a query is submitted to multiple search engines, (e.g. vertical search engines) and search results are returned from the search engines. The documents returned in the search results are each associated with a Uniform Resource Locator (URL). For each URL associated with a document, a frequency of the URLs' occurrence among the search results is determined. The documents are ranked based on the URL frequencies. The results returned from each search engine are thus combined and consolidated. End users are also thus presented with a single set of results from multiple search engines, in which the combined results returned from the multiple search engines are consolidated. Further, results are efficiently and effectively ranked, such that the results are combined and consolidated from multiple specialized search engines according to, for example, relevance.

Notation and Nomenclature

Some of the terms and phrases used herein have meanings as described in this section, unless specifically stated otherwise.

A search engine is software (executable instructions and data) configured for searching a set of information resources. A computer executing a search engine generates search results for search queries submitted to the search engine.

Search engines often run on servers, referred to herein as search engine servers. A server is a combination of integrated software components (including data) and an allocation of computational resources, such as memory, a node, and processes on a computer for executing the integrated software components, where the combination of the software and computational resources are dedicated to a particular function. In the case of a search engine server, the server is dedicated to searching for a set of information resources.

Search engines are widely used on the Internet, the World Wide Web (www, Web, WWW, etc.) and other large internetworks and information resource webs. Often, search engines are publicly accessible on servers as web sites, such as those made available with Yahoo™ and Google™ web pages, which are respectively accessible with the links (http://search.yahoo.com/) and (http://www.google.com/).

The set of information resources searched by search engines are referred to herein as documents. A document is any unit of information that may be indexed by search engine indexes. Search engine indexes are described below. Often a document is a file which may contain plain or formatted text, inline graphics, and other multimedia data, and hyperlinks to other documents. Documents may be static or dynamically generated.

Search engines use a search engine index (e.g., one or more), also referred to herein simply as an index, to search for information. Search engine indexes can be directories, in which content is indexed more or less manually, to reflect human observation. More typically, search engine indexes are created and maintained automatically by processes referred to herein as crawlers. Crawlers explore information over the Internet, essentially continuously, looking for as many documents as they may find at locations to which the crawlers are configured to search. Crawlers may follow links from one document to another. A crawler may retrieve (e.g., fetch, download) a web resource (e.g., a page), save an original form of the page or other resource, identify and extract links to other resources, pages, etc. This allows these resources/pages to be subsequently retrieved, as well. Upon retrieving a crawled page or other resource, other forms of information may be extracted from the crawled resources/pages.

The content extracted from the resources/pages retrieved with the crawler may then be indexed. The content of the resources/pages may be indexed (e.g., semantically, conceptually, etc.) in a search index and summarized in databases, typically of significant size. It is these indexes and databases that are actually searched in response to a search query. Thus generally, crawlers acquire content, which is consumed with an indexing process to build indexes.

In one configuration the software for a search engine may be configured to search one set of resources and in another configuration be configured to search another set of resources. Each such configuration comprises a different search engine.

Vertical search engines are engines that use indexes that index documents that are limited to a particular domain or particular topic. Vertical search engines may be limited in this way by, for example, configuring a crawler to search specific locations. For example, a crawler for a vertical search engine for recipes may be configured to search sites and/or locations known to hold recipe documents.

The search result generated by a search engine comprises a list of documents and may contain summary information about the document. The list of documents may be ordered. To order a list of documents, a search engine may assign a rank to each document in the list. When the list is sorted by rank, a document with a relatively higher rank may be placed closer to the head of the list than a document with a relatively lower rank. A search engine may rank the documents according to relevance to the search query. Relevance is a measure of how closely the subject matter of a document matches a search query's terms.

Illustrative Embodiment

FIG. 1 depicts an example process 100, according to an embodiment. Process 100 begins with ranking 101 a plurality of documents, each of which is associated with a Uniform Resource Locator (URL). The documents are returned as the result of a query that is computed by each search engine of a plurality of search engines. The plurality of documents returned may include one or more documents returned from each search engine. However, not every one of the search engines may return a document in response to a given query. Embodiments are well suited to rank documents that are returned in a situation in which, for a given set of search engines, not every search engine returns a document for every query.

For each URL associated with a document of the plurality of documents, a frequency of the URL is determined 102. The ranking described above (block 101) includes ranking the plurality of documents based on one or more factors. These factors are based on the frequency determined for each URL associated with the plurality of documents.

In an embodiment, the frequency $f_{url}$ ($u_i$, q, S) of each URL '$u_i$' associated with a document of a plurality of documents that are returned in response to a query 'q' executed over a plurality (e.g., set) of search engines 'S' is calculated to make the URL frequency determination 102. In an embodiment, the frequency of a URL is calculated according to Equation 1, below:

$$f_{url}(u_i,q,S)=|(s_i \supset u_i)|/|S| \quad \text{(Equation 1)}$$

in which $f_{url}$ is the URL frequency, $|S|$ is the total number of search engines over which the query q, is executed and $|(s_i \supset u_i)|$ is the total number of search engines, which return results that contain the URL, $u_i$, for the executed query q.

In an embodiment, the ranking of a document is measured according to its rarity (e.g., relative to the frequency of other URLs) across a set of search engine results. The rarity of a document in the search results returned from the search engines effectively comprises a metric of how interesting that document is. The ranking of the document thus corresponds in an embodiment with an inverted URL frequency. Searches preformed according to such an embodiment may thus return documents that are more highly specialized, obscure, which are usually ignored by other search engines. The results of such searches are thus likely to return results that generalized, e.g., non-specialized searches are unlikely to return.

For instance, generalized web searches typically return commonly accessed documents and do so with relatively high relevance rankings for those documents. Moreover, if a standard web search does manage to return a relatively rare document, its rarity will most probably yield it a relatively low relevancy ranking. A low relevancy ranking is likely to "bury" the document within the search results, where it can be obscured with many other search results. This can essentially force a user to hunt for it within pages of search results, which can be tedious and inefficient.

In an embodiment in which the ranking of a document in the search results is based upon its relative rarity, the ranking returned for a document with URL $u_i$, where $u_i$ is contained in at least one of the result sets returned by the plurality of search engines S, given the query q, is a function $f$ of the normalized rank ($R_{normalized}$) with the inverse of the frequency $f_{url}$ of the URL $u_i$, calculated according to Equation 2, below:

$$R_{overall}(u_i,q,S)=f(R_{normalized}(u_i,q,S),1/f_{url}(u_i,q,S)) \quad \text{(Equation 2)}$$

where $u_i$ belongs to the set of all URLs returned by executing q against S, in which the normalized rank ($R_{normalized}$) represents all other operations and calculations that are related to combining the native ranks for the search engines of the set S. In an embodiment, the other calculations associated with a document's rank can include, but are not limited to, handling of duplicate results across search engines, click through rates, and user ratings.

Embodiments are not limited to ranking a document according to its rarity across a set of search engine results. For instance, in an embodiment, the relevancy of a document is measured according to how common that document is across a set of search engine results, which can be a function of a non-inverted frequency associated with a URL. Searches preformed according to such an embodiment may thus return search results that reflect a common opinion, consensus or the like of other searchers, search engine creators, administrators and other participants (e.g., with vertical search).

Results of more specialized searches, such as vertical searches that have been customized by previous users, may be leveraged. This can allow results obtained for searches performed according to such an embodiment to reflect search results that have proven useful or popular, and thus to capitalize on the opinions, lessons and experience of others, integrate useful social factors such as collective knowledge and wisdom, and thus promote efficiency and economy in search engine use.

In an embodiment in which document relevancy is measured according to how common that document occurs in the search results across a set of search engine results, the overall ranking (R overall) of a document with URL $u_i$, where $u_i$ is contained in at least one of the result sets returned by the plurality of search engines S, given the query q is a function $f$ of the normalized rank ($R_{normalized}$) with the non-inverted frequency $f_{url}$ of the URL $u_i$, calculated according to Equation 3, below:

$$R_{overall}(u_i,q,S)=f(R_{normalized}(u_i,q,S),f_{url}(u_i,q,S)) \quad \text{(Equation 3)}$$

where $u_i$ belongs to the set of all URLs returned by executing q against S and in which the normalized rank ($R_{normalized}$) represents all other operations and calculations that are related to combining the native ranks for the search engines of the set S. In an embodiment, the other calculations associated with the normalized rank can include, but are not limited to, handling of duplicate results across search engines, click through rates, and user ratings.

The document frequencies determined can be used to consolidate search results that are returned from multiple search engines, as described in co-pending U.S. patent application Ser. No. 11/707,684, filed on Feb. 16, 2007 and entitled "Federated Search Implemented Across Multiple Search Engines" by Ryan Sue, which is assigned to the Assignee of the present Application and which is hereby incorporated by reference for all purposes as though fully set forth herein. In an implementation, overall ranks for each URL are assigned, based in an embodiment on a simple implementation of an overall ranking function such as sorting a list of frequencies. For instance, results, e.g., URLs, returned for an example query executed against three individual search engines 1, 2 and 3 are ranked (101) as shown in Table 1, below.

TABLE 1

| Search Engine 1 Results | Search Engine 2 Results | Search Engine 3 Results |
|---|---|---|
| A | A | D |
| B | D | F |
| C | E | G |

Frequencies for each URL returned in response to the query are determined (102), calculated for instance with Equation 1, above. A list of example frequencies are shown in Table 2, below.

TABLE 2

| URL | Frequency |
|---|---|
| A | 0.66 |
| B | 0.33 |
| C | 0.33 |
| D | 0.66 |
| E | 0.33 |
| F | 0.33 |
| G | 0.33 |

For assigning overall ranks for each URL, the list of frequencies is sorted. When sorted, the example frequencies shown in Table 2 are ranked as shown in Table 3, below. The rankings may be determined with Equation2 and/or Equation 3 above, or according to another ranking model.

TABLE 3

| URL | Ranking |
|---|---|
| A | 1 |
| D | 2 |
| B | 3 |
| C | 4 |
| E | 5 |
| F | 6 |
| G | 7 |

These rankings are presentable, e.g., to a user and/or for further processing.

The results returned from the multiple search engines are consolidated using in an embodiment the URL frequencies and/or the search engine ranks. For instance, the frequencies of the URLs returned with each search engine may be summed, as shown in Table 4, below.

TABLE 4

| | |
|---|---|
| Search Engine 1 Results: | 0.66 + 0.33 + 0.33 = 1.33 |
| Search Engine 2 Results: | 0.66 + 0.66 + 0.33 = 1.66 |
| Search Engine 3 Results: | 0.66 + 0.33 + 0.33 = 1.33 |

Search engine results may then be ranked according to their summed URL frequencies. Ranking according to the example results shown in Table 4, Search Engine 2 results are ranked first, Search Engine 1 results second and Search Engine 3 results third (e.g., one or more other criteria may be used to distinguish between tied results). These results may be presented to users in a variety of formats. For instance, the most relevant search results returned from the multiple search engines may be presented together. Additionally or alternatively, search results may be grouped according to which search engine returned them. Where presented according to a group format, the example results are shown in Table 5, below.

TABLE 5

| Search Engine Results 2 |
|---|
| A |
| D |
| E |
| Search Engine Results 1 |
| A |
| B |
| C |
| Search Engine Results 3 |
| D |
| F |
| G |

Example System

FIG. 2 depicts an example system 200, according to an embodiment. Embodiments may also (or alternatively) be practiced with other systems. Search federator 201 receives a user query. A federator, such as federator 201, may comprise one or more computer processes that execute software, in which the software causes the computer process to receive a search query, select one or more search engines based on the search query, and transmit the search query to the selected search engines. The federator may also consolidate the results, which are returned from multiple search engines in response to the search query. A federator may be an integrated component of a search engine, in which the one or more processes allocated to the search engine also execute the federator.

To select search engines to which to submit search queries, federator 201 needs information that can be used to make the selection. In an embodiment, federator 201 obtains such information by transforming the end user's query into a new query executed over the search meta-data engine 205.

Search meta-data engine 205 is a search engine which indexes information about other search engines, such as meta-data that describes and/or identifies the search engines. The metadata may include descriptors of topics relevant to a search engine and key words associated with the relevant topics. The results returned identify one or more search engines, for example, a web site, and/or the identity of a search engine index, as relevant to the end user's query.

Based on the results returned from search meta-data engine 205, federator 201 selects from among multiple search engines 211 and 212-299 the search engines to which to issue the search queries and then issues the queries to the selected search engines. The selection may be selection of a particular search engine, such as a search engine hosted by a search engine server (e.g. web site), or may be a search engine index. In the case of the latter, federator 201 submits a query to a selected search engine by submitting the query to a search engine configured for the search index.

Search results are then returned from each of the selected search engines. The results returned are then consolidated and ranked by federator 201. The ranking can be based on a variety of techniques, for instance, using frequencies of document identifiers such as uniform resource locators (URL). Further, in an embodiment, ranks are calculated for each search engine; the ranks are used to determine how to consolidate the search results from all the selected search engines.

Further, in an embodiment, a rank $R_{SE}$ is calculated for each search engine, as a function based upon the overall ranking of each document in the results returned therefrom. For instance, in an embodiment, the search engine rank $R_{SE\ i}$ for a search engine i is a function g of a list of overall ranks $R_i$ for each document returned from search engine i, according to Equation 4, below:

$$R_{SE\ i} = g(R_i) \qquad \text{(Equation 4).}$$

Additionally or alternatively, the search engine rank can be determined directly from the ranked frequencies of the URLs returned therefrom, e.g., as a sum or product thereof. In an embodiment in which the relevancy of a document in the search results is based upon its relative rarity, its relevance ranking is given with Equation 2, above. In an embodiment in which the relevancy of a document in the search results is based upon how common that document is across a set of search engine results, its overall relevance ranking is given with Equation 3, above.

In an embodiment, a relevance score and a relevance ranking are related as follows. A relevance score comprises a numeric value that represents how closely the subject matter of a document or set of documents matches a search query's terms. The calculation, scale, and numeric range of a relevance score may differ between search engines. A relevance rank comprises the position within an ordered list of a plurality of documents or set of pluralities of documents with relevance scores, in which a ranking function is used to order the documents or set of documents in the list. For instance, in an embodiment, the rank $R_{di}$ of a document $d_i$ within a single search engine is a function rank of the document $d_i$ and a plurality of documents with scores D, within which document $d_i$ is contained, according to equation 5, below.

$$R_{di} = \text{rank}(d_i, D) \qquad \text{(Equation 5).}$$

In an embodiment, the function rank($d_i$, D) is implemented by sorting the plurality of documents D into descending order based on the scores of each document. The position of document $d_i$ within the sorted list is then returned as the rank value $R_{di}$. When a document is ranked highly (e.g., it has a relatively low rank value), that document is positioned relatively close to the head of the sorted list of documents. Conversely, when a document has a low relevance rank value, that document is positioned relatively far from the head of the sorted list of documents.

In an embodiment, performance overhead or other costs that may be associated with executing the search meta-data or other characteristics based query can be avoided. However, the performance savings have a cost associated with having to execute the end user query against all of the multiple search engines, in which some of the multiple search engines may return content or other results that lack relevance to the end user's query.

Example Hardware Overview

Figure 3:
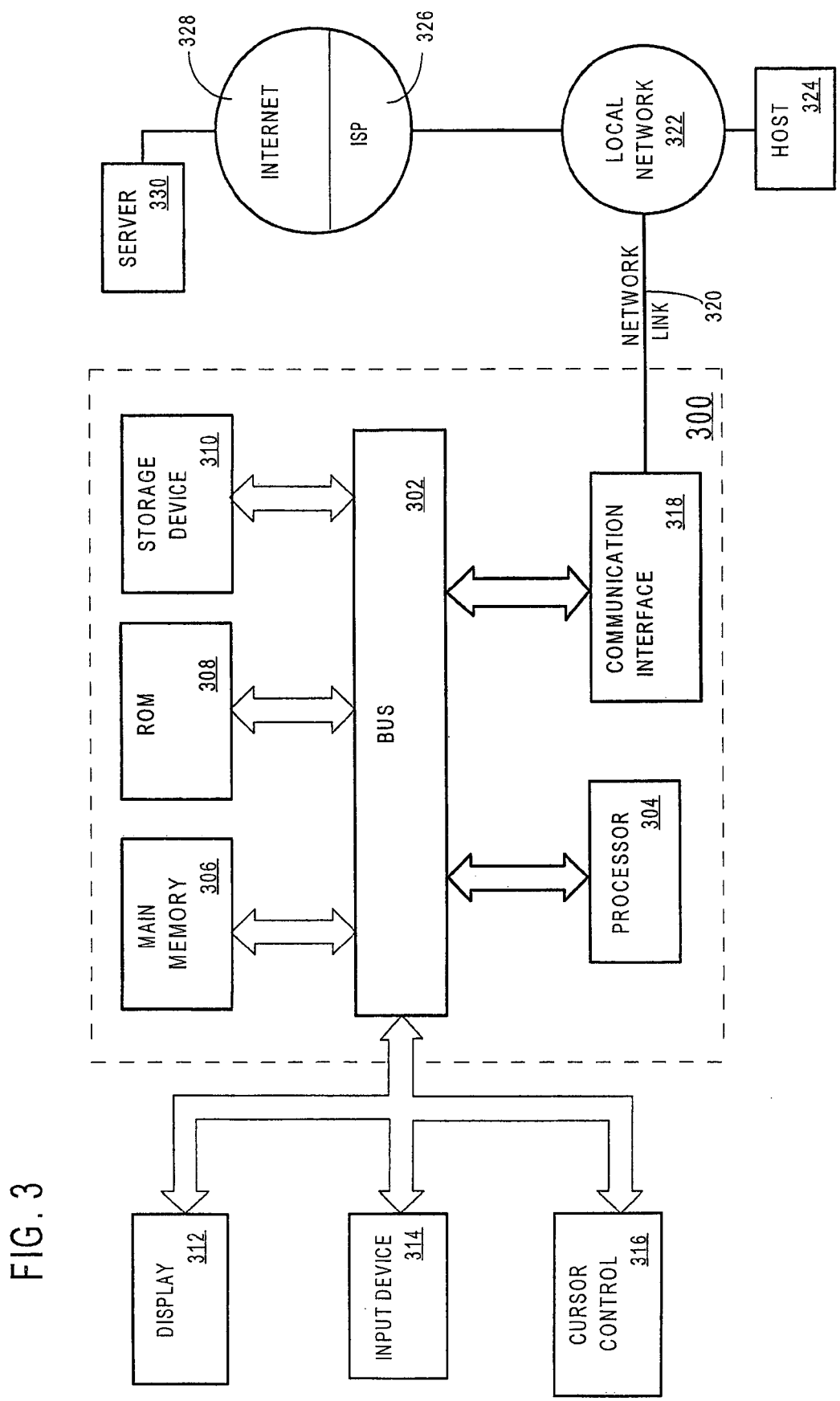
FIG. 3 depicts an example computer platform upon which an embodiment of the present invention may be practiced.

FIG. 3 depicts an example computer system 300 upon which an embodiment of the invention may be implemented. Computer system 300 includes a bus 302 or other communication mechanism for communicating information, and a processor 303 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a liquid crystal display (LCD), a cathode ray tube (CRT) or the like, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. Example embodiments of the invention relate to the use of computer system 300 for replicating changes, made to data blocks at a source database system, to replicas of the data blocks at the standby database system. According to one embodiment of the invention, replicating changes, made to data blocks at a source database system, to replicas of the data blocks at the standby database system is provided by one or more instances of computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes and other computer-readable media, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card a cable or digital subscriber line (DSL) modem or another modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for replicating changes, made to data blocks at a source database system, to replicas of the data blocks at the standby database system, as described herein.

The received code may be executed by processor 304 as it is received, and/or stored in storage device 310, or other non-volatile storage for later execution. In this manner, computer system 300 may obtain application code in the form of a carrier wave.

EQUIVALENTS, EXTENSIONS, ALTERNATIVES
& MISCELLANEOUS

Thus, example embodiments relating to a readable physical standby database system are described. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:

ranking a plurality of documents returned as a result of a query computed for each search engine of a plurality of search engines;

wherein each document of said plurality of documents is associated with a Uniform Resource Locator (URL);

wherein said plurality of documents includes at least one document returned as a result of said query from said each search engine;

for each URL associated with a document from said plurality of documents, determining a frequency of said URL;

wherein ranking said plurality of documents includes ranking said plurality of documents based on one or more factors, said one or more factors being based on said frequency determined for each URL associated with said plurality of documents;

wherein said frequency of a particular URL is based on a number of said plurality of search engines that return at least one document corresponding to the particular URL and a number of search engines over which said query is executed; and wherein ranking a particular document of said plurality of documents is based at least in part on an inverse function of the frequency of the URL associated with said particular document;

wherein the method is performed by one or more computing devices.

2. The method as recited in claim 1 wherein ranking said particular document comprises:

elevating a rank for said particular document, produced by said ranking, based at least in part on a determination that said frequency of said particular URL associated with said particular document is less than a frequency of another URL associated with another document of said plurality of documents.

3. The method as recited in claim 1 wherein ranking said plurality of documents returned as the result of said query computed for said each search engine of said plurality of search engines further comprises:

normalizing a plurality of native ranks for said plurality of documents to produce a plurality of normalized ranks for said plurality of documents;

ordering said plurality of documents based at least in part on said plurality of normalized ranks.

4. The method as recited in claim 1 wherein said one or more factors being based on the frequency of one or more terms in said document.

5. The method as recited in claim 1 further comprising:

selecting said plurality of search engines from multiple search engines based on said query and one or more criteria based at least in part on information relating to said plurality of search engines;

submitting said query to said plurality of search engines;

for each search engine of said plurality of search engines, receiving certain search results for said query submitted to said each search engine; and consolidating said certain search results based on the ranking of the plurality of documents, which are received from each search engine of said plurality of search engines.

6. A system, comprising:

a computer system, comprising one or more processors, configured to:

rank a plurality of documents returned as a result of a query computed for each search engine of a plurality of search engines;

wherein each document of said plurality of documents is associated with a Uniform Resource Locator (URL);

wherein said plurality of documents includes at least one document returned as a result of said query from said each search engine;

for each URL associated with a document from said plurality of documents, determine a frequency of said URL;

wherein ranking said plurality of documents includes ranking said plurality of documents based on one or more factors, said one or more factors being based on said frequency determined for each URL associated with said plurality of documents;

wherein said frequency of a particular URL is based on a number of said plurality of search engines that return at least one document corresponding to the particular URL and a number of search engines over which said query is executed; and wherein ranking a particular document of said plurality of documents is based at least in part on an inverse function of the frequency of the URL associated with said particular document.

7. The system as recited in claim 6 wherein said frequency is related to the total number of search engines over which said query is executed and to the number of search engines which return results that include said URL;

wherein, upon said ranking comprising an inverse function of said frequency, said ranking reflects a rarity of said document in relation to the other documents of said plurality of documents; and wherein, upon said ranking comprising an non-inverse function of said frequency, said ranking reflects a frequency of said document in relation to the other documents of said plurality of documents in said returned results.

8. A computer-readable volatile or non-volatile medium storing one or more sequences of instructions which, when executed by one or more processors, causes the one or more processors to perform the method recited in claim 1.

9. A computer-readable volatile or non-volatile medium storing one or more sequences of instructions which, when executed by one or more processors, causes the one or more processors to perform the method recited in claim 2.

10. A computer-readable volatile or non-volatile medium storing one or more sequences of instructions which, when executed by one or more processors, causes the one or more processors to perform the method recited in claim 3.

11. A computer-readable volatile or non-volatile medium storing one or more sequences of instructions which, when executed by one or more processors, causes the one or more processors to perform the method recited in claim 4.

12. A computer-readable volatile or non-volatile medium storing one or more sequences of instructions which, when executed by one or more processors, causes the one or more processors to perform the method recited in claim 5.

13. The method as recited in claim 1 wherein ranking said plurality of documents comprises sorting said plurality of documents based at least in part on said frequency determined for each URL associated with each document of said plurality of documents.

14. The method as recited in claim 1 wherein ranking said plurality of documents comprises sorting said plurality of documents based at least in part on a summation of said frequencies determined for each URL associated with one or more documents of said plurality of documents returned by a particular search engine of said plurality of search engines.

15. The method as recited in claim 1 further comprising ranking said plurality of search engines, wherein a rank for a particular search engine of said plurality of search engines is based at least in part on one of:

(a) ranks of one or more documents returned by said particular search engine; and (b) frequencies associated with the URLs of one or more documents returned by said particular search engine.

16. A computer-readable volatile or non-volatile medium storing one or more sequences of instructions which, when executed by one or more processors, causes the one or more processors to perform the method recited in claim 13.

17. A computer-readable volatile or non-volatile medium storing one or more sequences of instructions which, when executed by one or more processors, causes the one or more processors to perform the method recited in claim 14.

18. A computer-readable volatile or non-volatile medium storing one or more sequences of instructions which, when executed by one or more processors, causes the one or more processors to perform the method recited in claim 15.

* * * * *